US009766643B1

(12) United States Patent
Cai et al.

(10) Patent No.: US 9,766,643 B1
(45) Date of Patent: Sep. 19, 2017

(54) VOLTAGE REGULATOR WITH STABILITY COMPENSATION

(71) Applicant: Marvell International Ltd., Hamilton (BM)

(72) Inventors: Li Cai, Singapore (SG); Poh Boon Leong, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 8 days.

(21) Appl. No.: 14/676,694

(22) Filed: Apr. 1, 2015

Related U.S. Application Data

(60) Provisional application No. 61/974,135, filed on Apr. 2, 2014.

(51) Int. Cl.
*G06F 1/00* (2006.01)
*G05F 1/575* (2006.01)

(52) U.S. Cl.
CPC .................................... *G05F 1/575* (2013.01)

(58) Field of Classification Search
CPC ..... G05F 1/10; G05F 1/46; G05F 1/56; G05F 1/575
USPC ................................ 323/226, 269, 270, 303
See application file for complete search history.

(56) References Cited

U.S. PATENT DOCUMENTS 6,509,722 B2 1/2003 Lopata
6,603,292 B1 * 8/2003 Schouten ................ G05F 1/573 323/274
6,946,821 B2 * 9/2005 Hamon ................... G05F 1/565 323/273
7,288,978 B2 10/2007 Suzuki et al.
7,402,987 B2 7/2008 Lopata
7,446,515 B2 11/2008 Wang
7,622,991 B2 11/2009 Sauer
8,143,868 B2 3/2012 Dasgupta
8,169,203 B1 * 5/2012 Vemula .................. G05F 1/575 323/273
8,754,621 B2 6/2014 El-Nozahi
8,816,658 B1 * 8/2014 De Vita ................. G05F 1/575 323/275
2002/0105382 A1 8/2002 Kadanka
2004/0051508 A1 3/2004 Hamon et al.
2007/0159146 A1 7/2007 Mandal
2007/0210770 A1 * 9/2007 Dean ......................... G05F 1/46 323/273
2007/0257732 A1 11/2007 Farrar et al.
2008/0088286 A1 4/2008 Cho et al.
2008/0211313 A1 9/2008 Nakamura
2009/0021251 A1 1/2009 Simon
2009/0079406 A1 3/2009 Deng et al.
2010/0066320 A1 * 3/2010 Dasgupta .................. G05F 1/56 323/273

(Continued)

OTHER PUBLICATIONS http://www.talkingelectronics.com/projects/MOSFET/MOSFET.html,The MOSFET, Jul. 30, 2010, pp. 1-9.*

*Primary Examiner* — Alex Torres-Rivera

(57) ABSTRACT

In some implementations, a system includes a voltage regulating circuit and a compensation circuit. The voltage regulating circuit includes a pass element configured to provide a regulated voltage to a load. The compensation circuit is configured to adjust a variable resistance based on a current of the load, the variable resistance being coupled to a gate terminal of the pass element through a capacitor.

18 Claims, 3 Drawing Sheets

(56) References Cited

U.S. PATENT DOCUMENTS

| | | | | |
|---|---|---|---|---|
| 2012/0038332 | A1* | 2/2012 | Lin | G05F 1/575 323/277 |
| 2012/0126760 | A1* | 5/2012 | Vemula | G05F 1/575 323/271 |
| 2013/0002216 | A1* | 1/2013 | Kim | G05F 1/565 323/274 |
| 2014/0266103 | A1 | 9/2014 | Wang | |
| 2015/0015223 | A1* | 1/2015 | Chen | G05F 1/575 323/280 |

* cited by examiner

VOLTAGE REGULATOR WITH STABILITY COMPENSATION

CROSS REFERENCE TO RELATED APPLICATIONS

This disclosure claims the benefit of priority under 35 U.S.C. §119(e) of U.S. Provisional Application No. 61/974,135 filed on Apr. 2, 2014, titled "LDO Stability Compensation," the disclosure of which is hereby incorporated by reference in its entirety.

BACKGROUND

The present disclosure relates to voltage regulators.

Electronic circuits typically operate using a constant supply voltage. A voltage regulator is a circuit that can provide a constant supply voltage, and includes circuitry that continuously maintains an output of the voltage regulator, i.e., the supply voltage, at a predetermined value regardless of changes in load current or input voltage to the voltage regulator. For example, a battery used to power a mobile device may have a decreasing output voltage as the battery loses charge. A voltage regulator can supply a constant voltage to a load as long as the output voltage of the battery is greater than the constant voltage supplied to the load. The load can be any type of electronic circuit that receives a substantially constant voltage source. For example, the load may be a processor in a mobile device that has integrated functions such as wireless communication, image capture, and a user interface. Since tasks of the processor vary according to usage of the mobile device, the load the regulator must respond to are always changing.

One type of voltage regulator is a low-dropout regulator (LDO). A LDO is a DC linear voltage regulator that can regulate a supply voltage even when the input voltage to the LDO is very close to the supply voltage. The drop-out voltage of a voltage regulator is the minimum voltage difference that must be present from an input of the regulator to an output of the regulator for the regulator to provide a constant supply voltage. LDOs are voltage regulators that have a low drop-out voltage, e.g., lower than 50 mV.

FIG. 1 shows a conventional LDO 100 that provides a regulated output voltage $V_{OUT}$ from a power source voltage $V_{POWER}$ provided by a power supply, such as a battery, a transformer, or other voltage source (not shown). A fraction of the output voltage is fed back to an inverting input of an amplifier, e.g., a differential amplifier 102, through a resistor divider network including resistors R1 and R2, which makes the LDO 100 function in a closed loop. The feedback voltage $V_{FB}$ is compared with a reference voltage $V_{REF}$ provided to a non-inverting input of the amplifier 102. The output of the amplifier 102 is a voltage that is modulated as a function of the difference between the feedback voltage $V_{FB}$ and the reference voltage $V_{REF}$. The amplifier 102 provides the modulated voltage to the gate terminal of a pass element, e.g., pass transistor $M_N$. The amplifier 102 controls the current through the pass transistor $M_N$ to control the output voltage $V_{OUT}$. Hence, a steady voltage is attained at $V_{OUT}$. In steady state, the voltage VOUT is regulated around its nominal value which is equal to [(R2+R1) $V_{REF}$/R1].

While FIG. 1 includes the pass transistor $M_N$ as the pass element, any suitable pass element can be used. Examples of pass elements include Darlington circuits, NMOS (n-channel Metal Oxide Semiconductor) and PMOS (p-channel Metal Oxide Semiconductor) transistors, and NPN and PNP bipolar transistors. When a p-channel transistor, e.g., a PMOS transistor, is used as the pass element, the feedback voltage $V_{FB}$ is provided to the non-inverting input of the amplifier 102 and the reference voltage $V_{REF}$ is provided to the inverting input of the amplifier 102.

The transfer function of the LDO 100 has three poles and one zero. The dominant pole is set by the amplifier 102, and is controlled and fixed in conjunction with the transconductance $g_m$ of the amplifier 102. The second pole is set by the output elements, namely, the combination of the output capacitance of capacitor $C_{OUT}$ and the load capacitance and resistance. The third pole is due to parasitic capacitance around the pass transistor $M_N$. Because the load current $I_{LOAD}$ can vary between 1 μA to 100 mA, the second pole of the LDO 100, being affected by the load capacitance and resistance, can vary greatly, resulting in a feedback loop that can be difficult to stabilize for all load conditions.

SUMMARY

The present disclosure describes systems and techniques relating to a low dropout voltage regulator (LDO). In general, in one aspect, a system includes a voltage regulating circuit and a compensation circuit. The voltage regulating circuit includes a pass element configured to provide a regulated voltage to a load. The compensation circuit is configured to adjust a variable resistance based on a current of the load, the variable resistance being coupled to a gate terminal of a pass element through a capacitor.

In another aspect, a system includes a load and a voltage regulator coupled with the load. The voltage regulator is configured to provide a regulated supply voltage to the load. The voltage regulator includes a voltage regulating circuit and a compensation circuit. The voltage regulating circuit includes a pass element configured to provide the regulated supply voltage to the load. The compensation circuit configured to adjust a variable resistance based on the current of the load, the variable resistance being coupled to a gate terminal of the pass element through a capacitor.

In yet another aspect, a method includes providing, at a source terminal or a drain terminal of a pass element a regulated voltage to a load; while providing the regulated voltage, determining a current of the load; and adjusting a variable resistance based on the determined current of the load, the variable resistance being coupled to a gate terminal of the pass element through a capacitor.

The described systems and techniques can be implemented so as to realize one or more of the following advantages. The system can be used for low power and low cost implementations of LDOs. The compensation circuit can cause the LDO to be less sensitive to variations in resistance of a load. The compensation circuit need not add a significant number of current branches or extra components. The system may improve load regulation of the LDO for varying load conditions.

Details of one or more implementations are set forth in the accompanying drawings and the description below. Other features, objects, and advantages may be apparent from the description, the drawings, and the claims.

DETAILED DESCRIPTION

Figure 1:
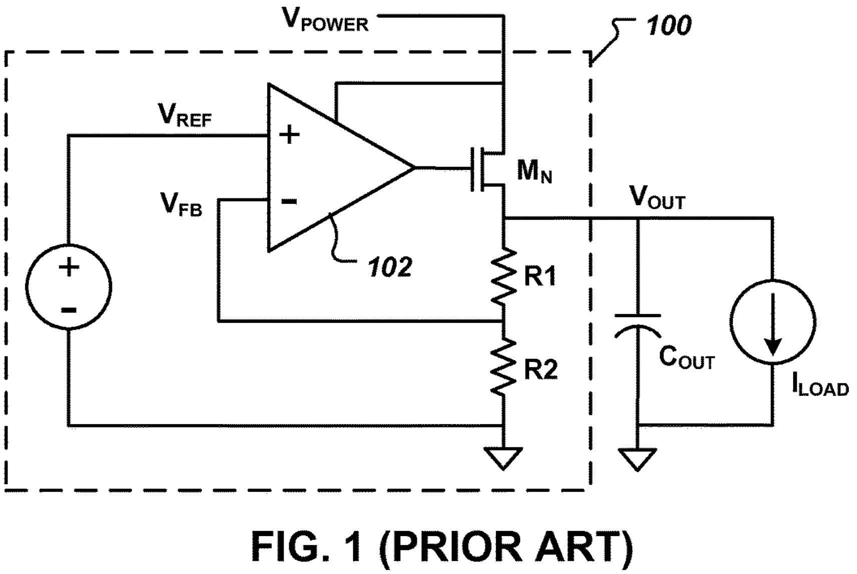
FIG. 1 (PRIOR ART)
FIG. 1 is a schematic diagram showing a conventional low-dropout voltage regulator (LDO) circuit.
Figure 2:
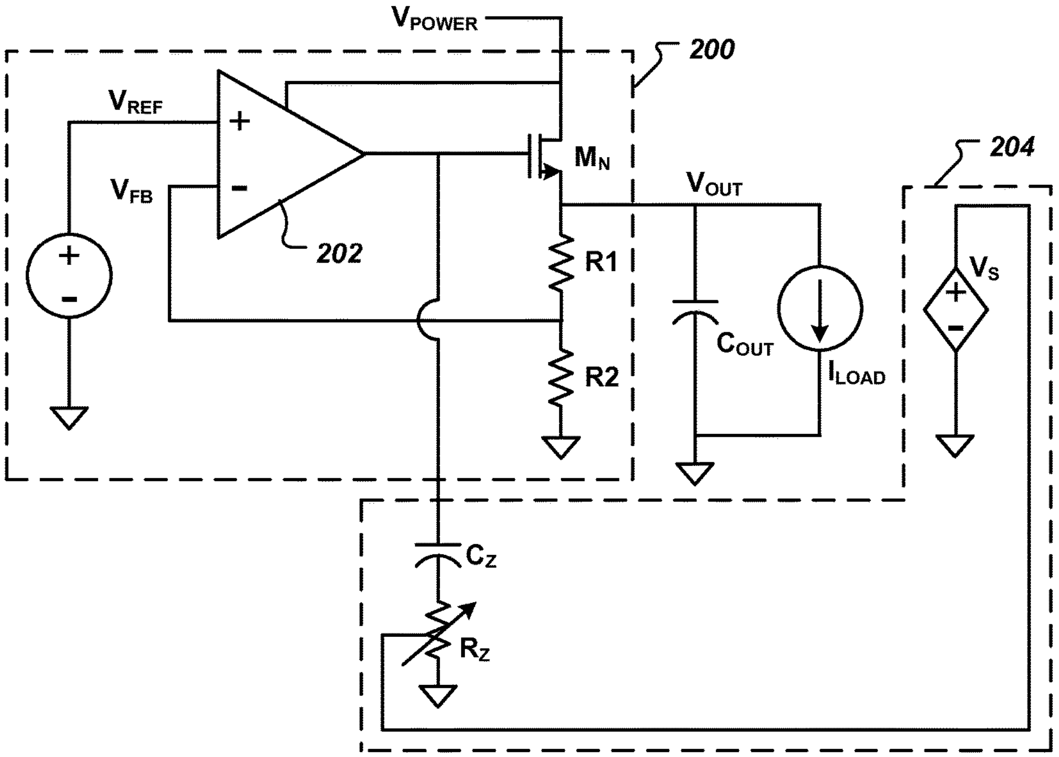
FIG. 2 is a schematic diagram showing an example of a compensation circuit coupled with a voltage regulating circuit in accordance with an implementation of the disclosure.

FIG. 2 is a schematic diagram showing an example of a compensation circuit 204 coupled with a voltage regulating circuit, such as a low-dropout voltage regulator (LDO) circuit 200. The LDO circuit 200 provides a regulated output voltage $V_{OUT}$ to a load from a power source voltage $V_{POWER}$ provided by a power supply, such as a battery, a transformer, or other voltage source (not shown). A fraction of the output voltage is fed back to an inverting input of an amplifier, e.g., differential amplifier 202, through a resistor divider network including resistors R1 and R2. The feedback voltage $V_{FB}$ is compared with a reference voltage $V_{REF}$ provided to a non-inverting input of the amplifier 202. The amplifier 202 provides a voltage to the gate terminal of a pass element, e.g., a NMOS pass transistor $M_N$, and controls the current through the pass transistor $M_N$ to control the output voltage $V_{OUT}$ at the source terminal of the pass transistor $M_N$.

While FIG. 2 includes the NMOS pass transistor $M_N$ as the pass element, any suitable pass element can be used. Examples of pass elements include NPN and PNP bipolar transistors, Darlington circuits, and NMOS and PMOS transistors. When a p-channel transistor, e.g., a PMOS transistor, is used as the pass element, the feedback voltage $V_{FB}$ is provided to the non-inverting input of the amplifier 202 and the reference voltage $V_{REF}$ is provided to the inverting input of the amplifier 202.

The transfer function of the LDO circuit 200 has a pole that is set by the output elements, namely, the combination of the output capacitance of capacitor $C_{OUT}$, the load capacitance, and the load resistance $R_{LOAD}$. The pole frequency for the LDO circuit 200 is defined by the following equation:

$$\omega_{out} = \frac{1}{C_{OUT}}\left(g_{Mn} + \frac{1}{R_{LOAD}}\right)$$

where $g_{Mn}$ is the transconductance of the NMOS pass transistor $M_N$. The pole frequency for an LDO that includes a PMOS transistor as the pass element is defined by the following equation:

$$\omega_{out} = \frac{1}{C_{OUT}\left(\frac{1}{R_{DS}} + \frac{1}{R_{LOAD}}\right)}$$

where $R_{DS}$ is the drain-to-source resistance of the PMOS pass transistor. As shown in the above equations, the load resistance $R_{LOAD}$ affects the pole frequency, and the impact of the load resistance $R_{LOAD}$ on the pole frequency is stronger for a LDO that includes a PMOS pass transistor than a LDO that includes a NMOS pass transistor. Because the pole changes its frequency value with a change in the load resistance $R_{LOAD}$, the LDO can be unstable due to a wide range of variations in the load current $I_{LOAD}$.

The compensation circuit 204 can be used to improve the stability of the LDO circuit 200 for a wide range of capacitive, resistive, or current loads. The compensation circuit 204 includes a current controlled voltage source $V_S$, a capacitor $C_Z$, and a variable resistor $R_Z$. The capacitor $C_Z$ is connected to the LDO circuit 200 between the output of the amplifier 202 and a gate terminal of the pass transistor $M_N$. The variable resistor $R_Z$ is connected in series with the capacitor $C_Z$ and connected to ground.

The capacitor $C_Z$ and the variable resistor $R_Z$ provide a zero to compensate for the pole in the transfer function of the LDO circuit 200. The current controlled voltage source $V_Z$ senses the load current $I_{LOAD}$ and provides a voltage corresponding to the sensed load current $I_{LOAD}$ to adjust the value of the variable resistor $R_Z$. The value of the variable resistor $R_Z$ tracks the load current $I_{LOAD}$, in effect tracking the load resistance $R_{LOAD}$. The frequency $\omega_Z$ of the zero provided by the capacitor $C_Z$ and the variable resistor $R_Z$ tracks the pole frequency $\omega_{out}$. The compensation circuit 204 can make the LDO circuit 200 less sensitive to variations of the load resistance $R_{LOAD}$.

Figure 3:
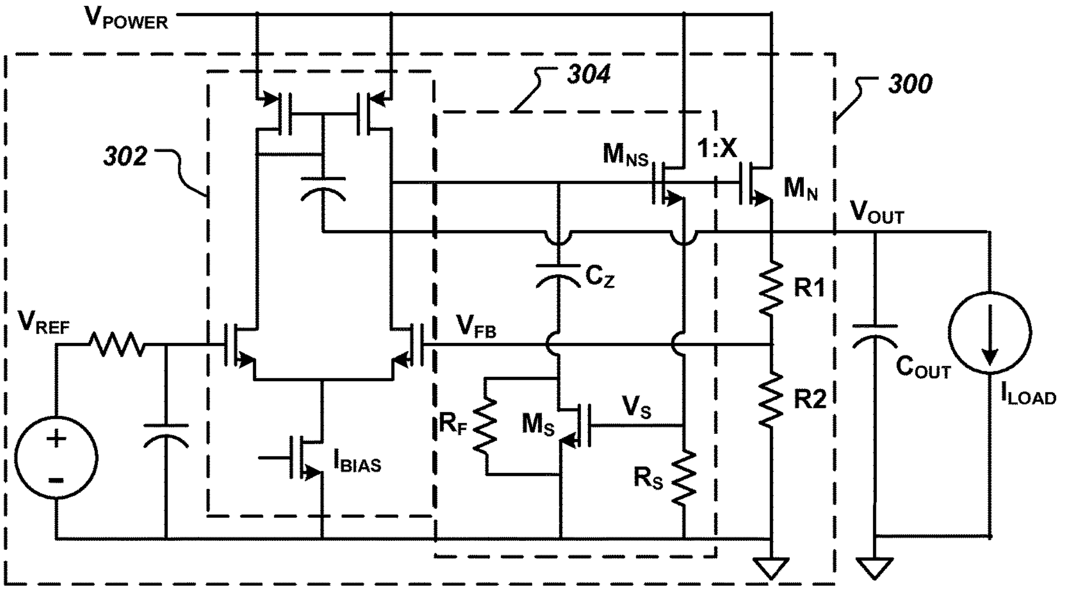
FIG. 3 is a schematic diagram showing an example of a voltage regulating circuit that includes a compensation circuit in accordance with an implementation of a LDO that includes a NMOS pass transistor as the pass element.

FIG. 3 is a schematic diagram showing an example of a voltage regulating circuit, such as a LDO circuit 300, that includes a compensation circuit 304 in accordance with an implementation of a LDO that includes a NMOS pass transistor as the pass element. The LDO circuit 300 provides a regulated output voltage $V_{OUT}$ to a load from a power source voltage $V_{POWER}$ provided by a power supply, such as a battery, transformer, or other voltage source (not shown). A fraction of the output voltage is fed back to an amplifier circuit 302 through a resistor divider network including resistors R1 and R2. The feedback voltage $V_{FB}$ is compared with a reference voltage $V_{REF}$. The amplifier circuit 302 provides a voltage to a gate terminal of a pass element, e.g., a NMOS pass transistor $M_N$, and controls the current through the pass transistor $M_N$ to control the output voltage $V_{OUT}$ at the source terminal of the pass transistor $M_N$.

The compensation circuit 304 can be used to improve the stability of the LDO circuit 300. The compensation circuit 304 includes a NMOS transistor $M_{NS}$. The amplifier circuit 302 controls the current through the transistor $M_{NS}$ along with controlling the current through the pass transistor $M_N$. The size of the transistor $M_{NS}$ and the size of the pass transistor $M_N$ can have a ratio of 1 to X. Because the transistor $M_{NS}$ and the pass transistor $M_N$ have their drain terminals connected to the same source voltage $V_{POWER}$ and are both controlled by the voltage at the output of the amplifier circuit 302, the load current $I_{LOAD}$ is mirrored from the pass transistor $M_N$ to the transistor $M_{NS}$ with a scaling factor equal to X. Choosing the sizes of the transistors $M_{NS}$ and $M_N$ to provide a large scaling factor can ensure that the extra current branch formed by the transistor $M_{NS}$ does not consume too much current under a heavy load current condition. The value of X may vary for different implementations. In some implementations, the value of X may be 15. Under a heavy load current condition, the sensed current through the current branch formed by the transistor $M_{NS}$ may not scale with the current through the current branch formed by pass transistor $M_N$ at exactly the ratio of 1 to X. For more accurate current sensing, an amplifier (not shown) may be used to force the voltage at the source terminals of the pass transistor $M_N$ and the transistor $M_{NS}$ to be the same, in which case the value of the scaling factor X may be selected to suit a low power design under varying load conditions.

The transistor $M_{NS}$ and the resistor $R_S$ provide a current controlled voltage source. The current flowing through the transistor $M_{NS}$ corresponds to the load current $I_{LOAD}$ and is converted to a voltage $V_S$ through a resistor $R_S$. The voltage $V_S$ is provided to a NMOS transistor $M_S$ that provides a variable resistance controlled by the voltage $V_S$. A resistor $R_F$ can be connected in parallel with the transistor $M_S$ for extra design freedom in choosing nominal values and tolerances for the transistor $M_S$. A capacitor $C_Z$ is connected to the output of the amplifier circuit 302 and the gate terminals of transistors $M_N$ and $M_{NS}$, and the transistor $M_S$ is connected in series with the capacitor $C_Z$ and ground. The transistor $M_S$, resistor $R_F$, and capacitor $C_Z$ add a zero into the transfer function of the LDO circuit 300 to compensate for the pole defined by the output elements connected to the output of the LDO circuit 300. The added zero improves the stability of the LDO circuit 300 and reduces the sensitivity of the LDO circuit 300 to variations in the load current $I_{LOAD}$.

Figure 4:
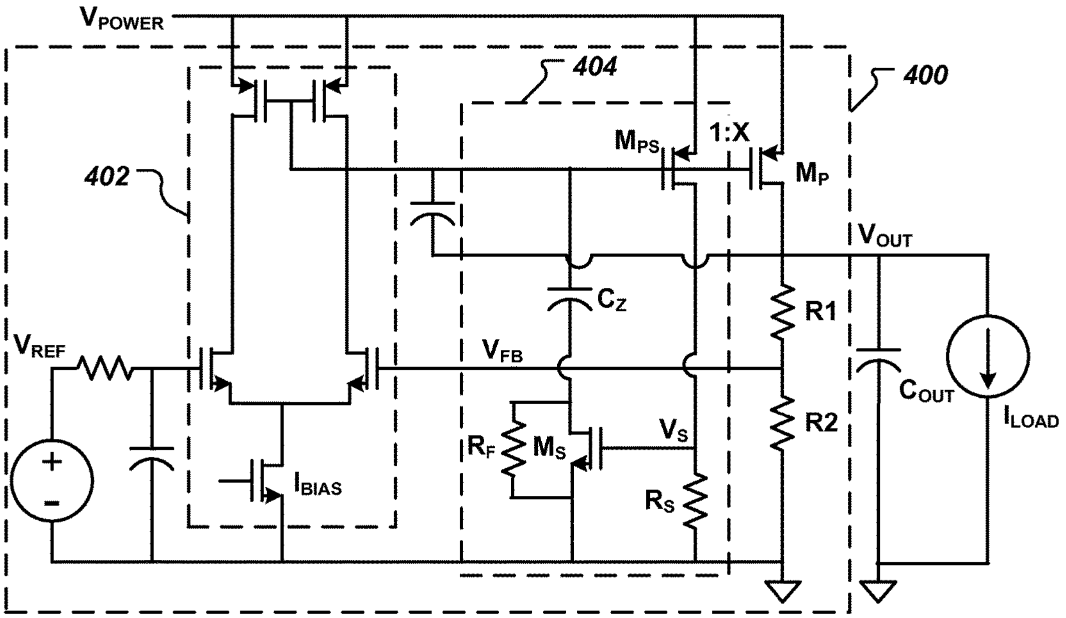
FIG. 4 is a schematic diagram showing an example of a voltage regulating circuit that includes a compensation circuit in accordance with an implementation of a LDO that includes a PMOS pass transistor as the pass element.

FIG. 4 is a schematic diagram showing an example of a voltage regulating circuit, such as a LDO circuit 400, that includes a compensation circuit 404 in accordance with an implementation of a LDO that includes a PMOS pass transistor as the pass element. The LDO circuit 400 provides a regulated output voltage $V_{OUT}$ to a load from a power source voltage $V_{POWER}$ provided by a power supply, such as a battery, a transformer, or other voltage source (not shown). A fraction of the output voltage is fed back to an amplifier circuit 402 through a resistor divider network including resistors R1 and R2. The feedback voltage $V_{FB}$ is compared with a reference voltage $V_{REF}$. The amplifier circuit 402 provides a voltage to the gate terminal of a pass element, e.g., PMOS pass transistor $M_P$, and controls the current through the pass transistor $M_P$ to control the output voltage $V_{OUT}$ at the drain terminal of the pass transistor $M_P$.

The compensation circuit 404 can be used to improve the stability of the LDO circuit 400. The compensation circuit 404 includes a PMOS transistor $M_{PS}$. The amplifier circuit 402 controls the current through the transistor $M_{PS}$ along with controlling the current through the pass transistor $M_P$. The size of the transistor $M_{PS}$ and the size of the pass transistor $M_P$ can have a ratio of 1 to X. Because the transistor $M_{PS}$ and the pass transistor $M_P$ have their source terminals connected to the same source voltage $V_{POWER}$ and are both controlled by the voltage at the output of the amplifier circuit 402, the load current $I_{LOAD}$ is mirrored from the pass transistor $M_P$ to the transistor $M_{PS}$ with a scaling factor equal to X. Choosing the sizes of the transistors $M_{PS}$ and $M_P$ to provide a large scaling factor can ensure that the extra current branch formed by the transistor $M_{PS}$ does not consume too much current under a heavy load current condition. The value of X may vary for different implementations. In some implementations, the value of X may be 15. Under a heavy load current condition, the sensed current through the current branch formed by the transistor $M_{PS}$ may not scale with the current through the current branch formed by pass transistor $M_P$ at exactly the ratio of 1 to X. For more accurate current sensing, an amplifier (not shown) may be used to force the voltage at the drain terminals of the pass transistor $M_N$ and the transistor $M_{NS}$ to be the same, in which case the value of the scaling factor X may be selected to suit a low power design under varying load conditions.

The transistor $M_{PS}$ and the resistor $R_S$ provide a current controlled voltage source. The current flowing through the transistor $M_{PS}$ corresponds to the load current $I_{LOAD}$ and is converted to a voltage $V_S$ through a resistor $R_S$. The voltage $V_S$ is provided to a NMOS transistor $M_S$ that provides a variable resistance controlled by the voltage $V_S$. A resistor $R_F$ can be connected in parallel with the transistor $M_S$ for extra design freedom in choosing nominal values and tolerances for the transistor $M_S$. A capacitor $C_Z$ is connected to the output of the amplifier circuit 402 and to the gate terminals of transistors $M_P$ and $M_{PS}$, and the transistor $M_S$ is connected in series with the capacitor $C_Z$ and ground. The transistor $M_S$, resistor $R_F$, and capacitor $C_Z$ add a zero into the transfer function of the LDO circuit 400 to compensate for the pole defined by the output elements connected to the output of the LDO circuit 400. The added zero improves the stability of the LDO circuit 400 and reduces the sensitivity of the LDO circuit 400 to variations in the load current $I_{LOAD}$.

Figure 5:
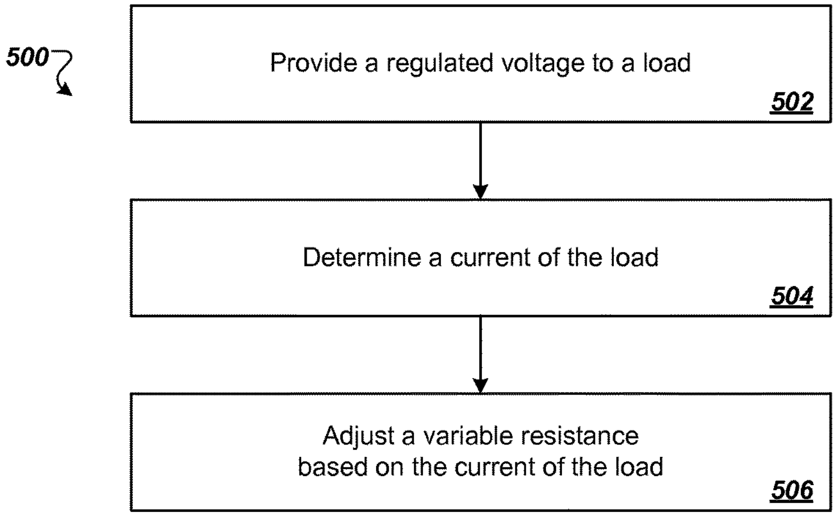
FIG. 5 is a flowchart showing examples of operations performed by a voltage regulator that includes a compensation circuit.

FIG. 5 is a flowchart showing examples of operations 500 performed by a voltage regulator, such as a LDO, that includes a compensation circuit. At 502, a regulated voltage is provided to a load. The regulated voltage is provided at a source terminal or a drain terminal of a pass element. In implementations where the pass element is a n-channel pass transistor, the regulated voltage is provided at a source terminal of the n-channel pass transistor. In implementations where the pass element is a p-channel pass transistor, the regulated voltage is provided at a drain terminal of the p-channel pass transistor. The regulated voltage can be provided using an amplifier that receives a power source voltage, a reference voltage, and a feedback voltage, as described above.

At 504, a current of the load is determined. The current of the load can be determined using a current controlled voltage source. The current controlled voltage source can be implemented using a transistor and a resistor, as described above in reference to FIG. 3 and FIG. 4.

At 506, a variable resistance is adjusted based on the determined current of the load. To adjust the variable resistance, the current controlled voltage source can provide a voltage to a variable resistor, as described above in reference to FIG. 2, or to a transistor that provides the variable resistance, as described above in reference to FIG. 3 and FIG. 4.

A few implementations have been described in detail above, and various modifications are possible. The circuits described above may be implemented in electronic circuitry, such as the structural means disclosed in this specification and structural equivalents thereof. While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Other implementations fall within the scope of the following claims.

What is claimed is:

1. A system comprising:

a voltage regulating circuit including a pass element configured to provide a regulated voltage to a load; and a compensation circuit configured to adjust a variable resistance based on a current of the load, wherein the compensation circuit comprises:

a current controlled voltage source comprising a first transistor coupled with the pass element, where a current that flows through the first transistor corresponds to the current of the load, and a first resistor, coupled between the first transistor and a ground, to provide a current controlled voltage that adjusts the variable resistance based on the current that flows through the first transistor, a capacitor coupled with a gate terminal of the pass element and a gate terminal of the first transistor, a second transistor coupled in series between the capacitor and the ground to provide the variable resistance in accordance with the current controlled voltage received at a gate terminal of the second transistor, wherein the first resistor is coupled between the gate terminal of the second transistor and the ground, and a second resistor coupled in parallel with the second transistor, the second resistor being coupled with the ground, and wherein at least the capacitor, the second transistor, and the second resistor reduce a sensitivity of the system to variations in the current of the load.

2. The system of claim 1, wherein the first transistor is a NMOS (n-channel Metal Oxide Semiconductor) transistor.

3. The system of claim 1, wherein:

the voltage regulating circuit has a transfer function that has a pole defined at least partly by a capacitance and a resistance of the load; and the compensation circuit adds a zero into the transfer function to compensate for the pole.

4. The system of claim 1, wherein the voltage regulating circuit is a low-dropout voltage regulating circuit.

5. The system of claim 1, wherein the first resistor is coupled between a drain terminal of the first transistor and the ground, and wherein the gate terminal of the second transistor is coupled with the drain terminal of the first transistor.

6. The system of claim 1, wherein the first resistor is coupled between a source terminal of the first transistor and the ground, and wherein the gate terminal of the second transistor is coupled with the source terminal of the first transistor.

7. The system of claim 1, wherein the first transistor is a PMOS (p-channel Metal Oxide Semiconductor) transistor.

8. A system comprising:

a load; and a voltage regulator coupled with the load and configured to provide a regulated supply voltage to the load, the voltage regulator comprising:

a voltage regulating circuit including a pass element configured to provide the regulated supply voltage to the load, and a compensation circuit configured to adjust a variable resistance based on a current of the load, wherein the compensation circuit comprises:

a current controlled voltage source comprising a first transistor coupled with the pass element, where a current that flows through the first transistor corresponds to the current of the load, and a first resistor coupled between the first transistor and a ground to provide a current controlled voltage that adjusts the variable resistance based on the current that flows through the first transistor, a capacitor coupled with a gate terminal of the pass element and a gate terminal of the first transistor, a second transistor coupled in series between the capacitor and the ground to provide the variable resistance in accordance with the current controlled voltage received at a gate terminal of the second transistor, wherein the first resistor is coupled between the gate terminal of the second transistor and the ground, a second resistor coupled in parallel with the second transistor, the second resistor being coupled with the ground, and wherein at least the capacitor, the second transistor, and the second resistor reduce a sensitivity of the system to variations in the current of the load.

9. The system of claim 8, wherein the first transistor is one of a NMOS (n-channel Metal Oxide Semiconductor) transistor or a PMOS (p-channel Metal Oxide Semiconductor) transistor.

10. The system of claim 8, wherein:

the voltage regulating circuit has a transfer function that has a pole defined at least partly by a capacitance and a resistance of the load; and the compensation circuit adds a zero into the transfer function to compensate for the pole.

11. The system of claim 8, wherein the voltage regulating circuit is a low-dropout voltage regulating circuit.

12. The system of claim 8, wherein the first resistor is coupled between a non-gate terminal of the first transistor and the ground, and wherein the gate terminal of the second transistor is coupled with the non-gate terminal of the first transistor.

13. The system of claim 12, wherein the non-gate terminal of the first transistor is a drain terminal of the first transistor.

14. The system of claim 12, wherein the non-gate terminal of the first transistor is a source terminal of the first transistor.

15. A method comprising:

providing, at a source terminal or a drain terminal of a pass element, a regulated voltage to a load;

while providing the regulated voltage, determining a current of the load;

adjusting a variable resistance based on the determined current of the load, the variable resistance being coupled to a gate terminal of the pass element through a capacitor;

providing, through a first transistor coupled with the pass element, a current corresponding to the determined current of the load; and providing, via a first resistor coupled between the first transistor and a ground, a current controlled voltage that adjusts the variable resistance based on the current flowing through the first transistor, wherein adjusting the variable resistance comprises:

receiving the current controlled voltage at a gate terminal of a second transistor provided by the first resistor coupled between the gate terminal of the second transistor and the ground, providing, by the second transistor, the variable resistance in accordance with the current controlled voltage, the second transistor being coupled in series between the capacitor and the ground, and reducing a sensitivity to variations in the determined current of the load based on the capacitor, the second transistor, and a second resistor, the second resistor being coupled in parallel with the second transistor, and the second resistor being coupled with the ground.

16. The method of claim 15, wherein the first transistor is one of a NMOS (n-channel Metal Oxide Semiconductor) transistor or a PMOS (p-channel Metal Oxide Semiconductor) transistor.

17. The method of claim 15, further comprising:

adding a zero into a transfer function of a voltage regulation circuit, which generates the regulated voltage, to compensate for a pole based in part on the variable resistance, wherein the pole is defined at least partly by a capacitance and a resistance of the load.

18. The method of claim 15, wherein providing the regulated voltage comprises:

providing a regulated voltage at an output of a low-dropout voltage regulator.

* * * * *